United States Patent
Hoffmann et al.

(10) Patent No.: US 9,880,553 B1
(45) Date of Patent: Jan. 30, 2018

(54) SYSTEM AND METHOD FOR ROBOT SUPERVISORY CONTROL WITH AN AUGMENTED REALITY USER INTERFACE

(71) Applicant: HRL Laboratories, LLC, Malibu, CA (US)

(72) Inventors: Heiko Hoffmann, Simi Valley, CA (US); Michael J. Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/139,039

(22) Filed: Apr. 26, 2016

Related U.S. Application Data

(60) Provisional application No. 62/153,931, filed on Apr. 28, 2015.

(51) Int. Cl.
*G05D 1/00* (2006.01)
*B25J 9/16* (2006.01)
(Continued)

(52) U.S. Cl.
CPC .......... *G05D 1/0038* (2013.01); *B25J 9/1689* (2013.01); *B25J 19/023* (2013.01); *G05D 1/0016* (2013.01); *G05D 1/0251* (2013.01); *G06F 3/04842* (2013.01); *G06F 3/04845* (2013.01); *G06T 11/60* (2013.01);
(Continued)

(58) Field of Classification Search
CPC .. G05D 1/0038; G05D 1/0016; G05D 1/0251; G05D 2201/0217; B25J 9/1689; B25J 19/023; G06F 3/04842; G06F 3/04845
See application file for complete search history.

(56) References Cited

U.S. PATENT DOCUMENTS 9,387,589 B2 * 7/2016 Barajas .................. B25J 9/1697
9,527,207 B2 * 12/2016 Low ....................... B25J 9/0087
(Continued)

OTHER PUBLICATIONS

D. Comaniciu and P. Meer, in "Mean Shift: A Robust Approach Towards Feature Space Analysis," IEEE Transactions on Pattern Analysis and Machine Intelligence, vol. 24, No. 5, May 2002, pp. 603-619.

Klein, Georg, and David Murray. "Parallel tracking and mapping for small AR workspaces." In Mixed and Augmented Reality, 2007. ISMAR 2007. 6th IEEE and ACM International Symposium on, pp. 225-234. IEEE, 2007.

(Continued)

*Primary Examiner* — Todd Melton
(74) *Attorney, Agent, or Firm* — Tope-McKay & Associates

(57) ABSTRACT

Described is a system for robot supervisory control. The system includes an operator device that receives camera imagery from a camera mounted on a robot and three-dimensional (3D) data from a 3D sensor mounted on the robot. The user interface displays a two-dimensional (2D) view of the scene from the camera and 3D sensor data. One or more object markers of objects in the scene are overlaid on the 2D view or 3D sensor data. Viewing the scene, the user can choose a robotic action from a library of actions, which generates a simulation of the robot performing the selected action. The simulation is then rendered and overlaid on top of the 3D sensor data. Moreover, the simulation shows the expected variability of the robot's action. Based on the simulation's outcome, the user can approve and trigger the execution of the action in the real robot.

21 Claims, 7 Drawing Sheets

(51) Int. Cl.
  B25J 19/02    (2006.01)
  G05D 1/02     (2006.01)
  H04N 13/02    (2006.01)
  H04N 5/225    (2006.01)
  G06T 11/60    (2006.01)
  G06F 3/0484   (2013.01)
(52) U.S. Cl.
  CPC ....... *H04N 5/2253* (2013.01); *H04N 13/0203* (2013.01); *G05D 2201/0217* (2013.01); *Y10S 901/01* (2013.01)

(56) References Cited

U.S. PATENT DOCUMENTS

2016/0257000 A1* 9/2016 Guerin .................. B25J 9/1605
2016/0318185 A1* 11/2016 Savarimuthu .......... B25J 9/1689

OTHER PUBLICATIONS

Rusinkiewicz, S. and Levoy, M. in "Efficient variant of the ICP algorithm," Proceedings of 3 D Digital Imaging and Modelling (3DIM) (2001), pp. 145-152.

Szegedy, Christian, Alexander Toshev, and Dumitru Erhan. "Deep neural networks for object detection." In Advances in Neural Information Processing Systems, pp. 2553-2561. 2013.

Heiko Hoffmann, Peter Pastor, Dae-Hyung Park, and Stefan Schaal in "Biologically-inspired dynamical systems for movement generation: Automatic real-time goal adaptation and obstacle avoidance," IEEE International Conference on Robotics and Automation (2009), pp. 2587-2592.

Kass, M.; Witkin, A.; Terzopoulos, D. (1988). "Snakes: Active contour models," International Journal of Computer Vision 1 (4), pp. 321-331.

* cited by examiner

SYSTEM AND METHOD FOR ROBOT SUPERVISORY CONTROL WITH AN AUGMENTED REALITY USER INTERFACE

CROSS-REFERENCE TO RELATED APPLICATIONS

This is a non-provisional application of U.S. Ser. No. 62/153,931, filed on Apr. 28, 2015, the entirety of which is incorporated by reference as though fully set forth herein.

BACKGROUND OF INVENTION (1) Field of Invention

The present invention relates to a system for robot supervisory control and, more particularly, to a system for robot supervisory control through the use of perception-based markers and augmented reality.

(2) Description of Related Art

Autonomous robots typically suffer from limited situational awareness. To provide autonomous control, the prior art generally relies upon the use of programming robots by defining waypoints. For example, interactive interfaces allow the specification of multiple robot arm poses. However, the limitation of this approach is that aligning a robot posture with visual input is very tedious. Moreover, rigid postures do not account for necessary adjustments to cope with uncertain contact surfaces and dynamic obstacles (such as moving objects). Another approach is to select from pre-programmed tasks; in this case, the robot cannot deal with unplanned situations, which likely occur during rescue or military operations.

For autonomous control, the state of the art is still too far away from enabling a humanoid (or similarly complex robot) to do useful tasks; thus, a human operation still needs to be involved (e.g., through teleoperation). Tele-operation is the control of a robot from a distance, such as through use of a remote control device. To provide further situational awareness to the tele-operator, such tele-operated robots often include cameras. While generally operable, many issues remain such as, inadequate resolution, lag in the video image, and lag in the mechanical and movement responses of the robot.

Thus, a continuing need exists for an improved system for robot supervisory control that enables an operator to command high-level goals, while having adaptable software to deal with an uncertain environment.

SUMMARY OF INVENTION

Described is a system for robot supervisory control. In some embodiments, system includes an operator device, the operator device having one or more processors and a memory. The memory is a non-transitory computer-readable medium having executable instructions encoded thereon, such that upon execution of the instructions, the one or more processors perform several operations, such as receiving camera imagery from a camera mounted on a robot, the camera generating camera imagery from a scene in front of the robot, the scene having one or more objects therein; receiving three-dimensional (3D) data from a sensor mounted on the robot; displaying a user interface that includes a two-dimensional (2D) view of the scene from the camera and 3D data from the sensor; overlaying one or more object markers of objects in the scene on the 2D view or 3D data; receiving a selected action from an operator regarding objects in the scene and generating a simulation of the robot performing the selected action; and rendering the simulation overlaid on top of the 3D data.

In another aspect, the operator device is configured for receiving, via the user interface, commands from a user to add or modify object markers for objects or obstacles in the 2D view of the scene.

In yet another aspect, a robot is included. The robot has a camera and a three-dimensional (3D) sensor mounted thereto, the 3D sensor generating the 3D sensor data (such as a 3D point cloud or other 3D sensor data). Alternatively, the robot may include a stereoscopic camera mounted thereto that generates the 3D sensor data.

In another aspect, the system include a library of actions from which a user chooses commands for the robot.

Additionally, the user interface is operable for allowing a user to manipulate object markers in the scene, where the manipulation involves changing object marker size or position.

In another aspect, a subset of the object markers label obstacles in the scene.

In yet another aspect, the system include an overlay display showing variability of the simulation of the robot performing the selected action.

Additionally, the scene is dynamic and the operator device displays an evolving scene.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
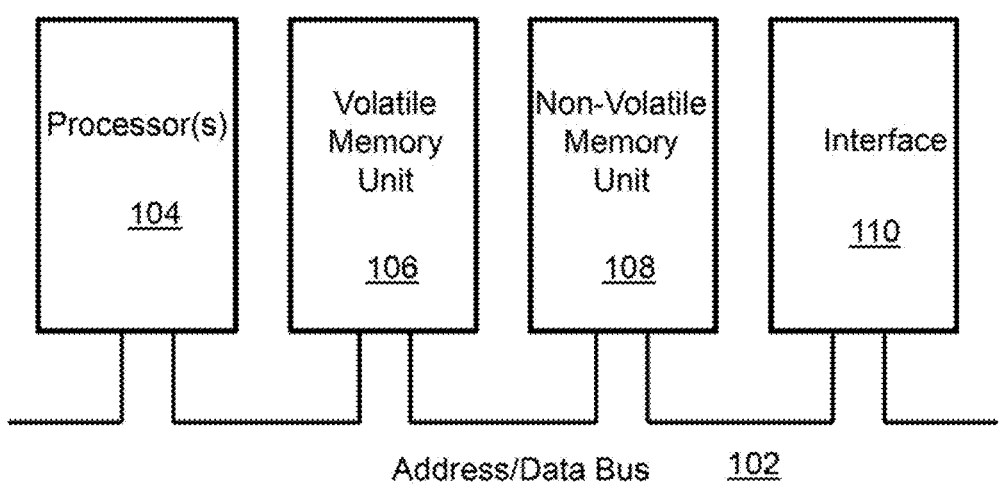
FIG. 1 is a block diagram depicting the components of a system according to an embodiment.
Figure 1:
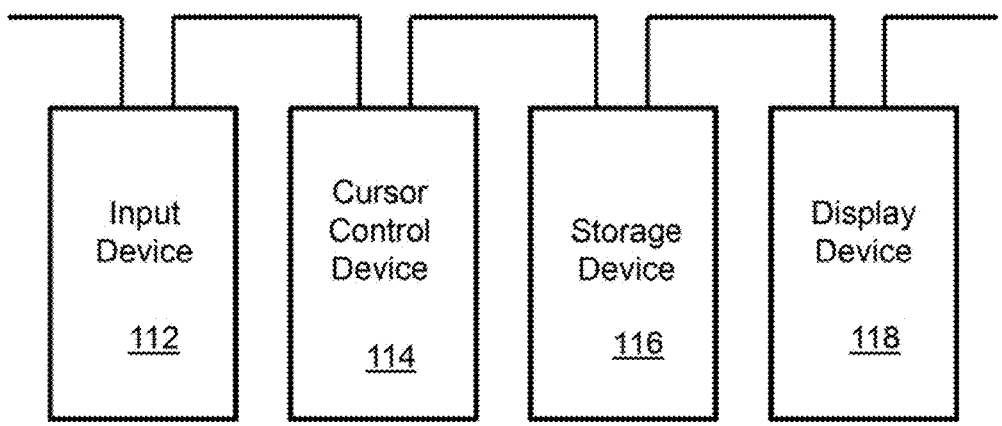

The present invention relates to a system for robot supervisory control and, more particularly, to a system for robot supervisory control through the use of perception-based markers and augmented reality. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is a system for robot supervisory control. The system is typically in the form of a computer system (with one or more processors) operating software or in the form of a "hard-coded" instruction set. This system may be incorporated into a wide variety of devices that provide different functionalities. For example, in an embodiment, the system may include an operator device that provides an augmented reality user interface for generating simulated robot actions and a real world robot for executing the actions. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. The system may be implemented in a single device or in multiple devices, such as in a tablet computer (having a user interface described below) and in a robot (having a camera and three-dimensional sensor). In one embodiment and when in multiple devices (e.g., an operator device and a robot), the system may include two or more computer systems (as described below and illustrated), one or more for each device.

In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100, In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
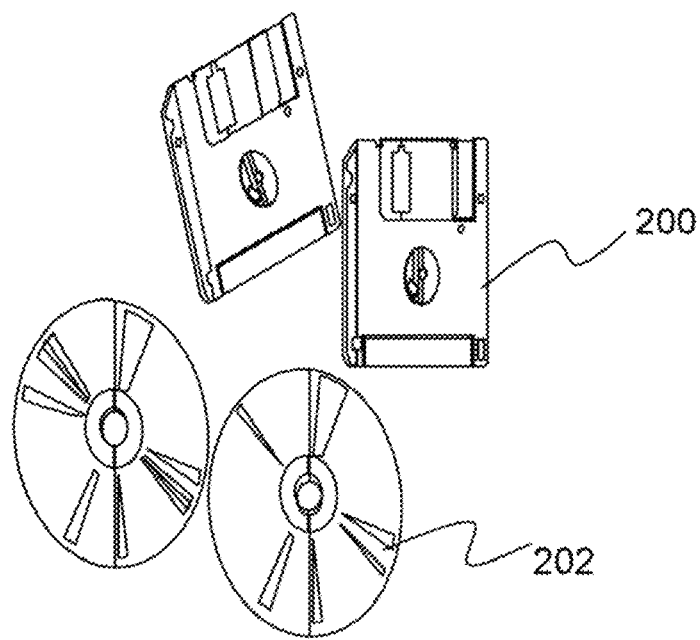
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

Figure 3:
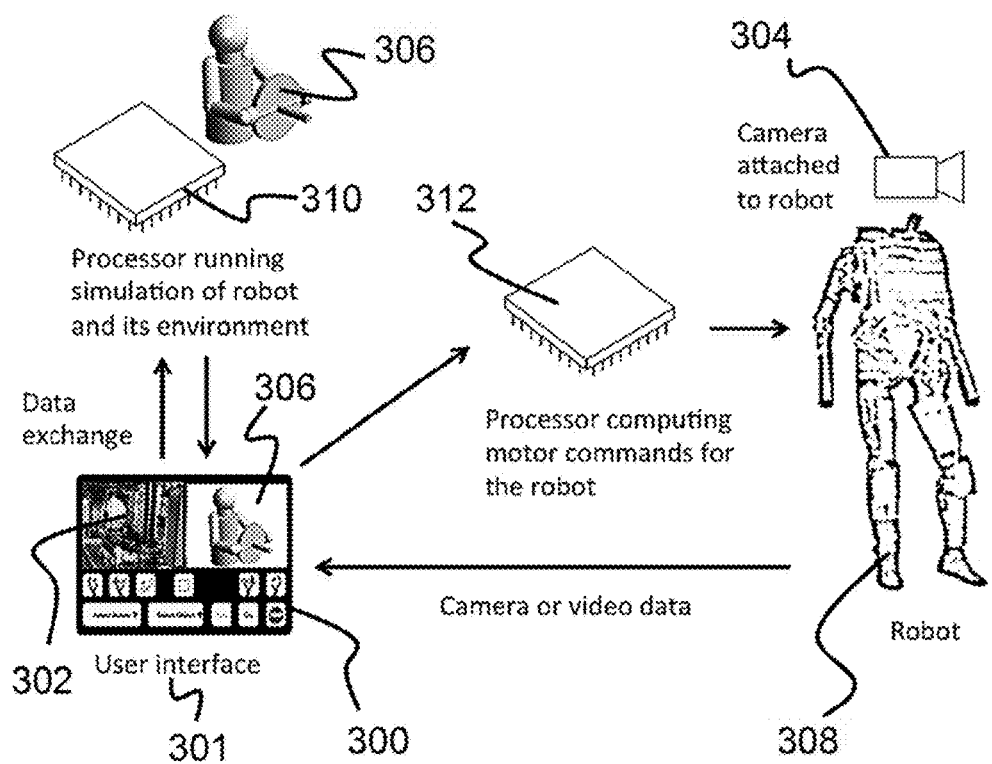
FIG. 3 is an illustration depicting elements according to an embodiment.

Described is a system for robot supervisory control with an augmented reality user interface. This system provides a solution for supervisory robotic control and deals with the challenge of limited situational awareness. As show in FIG. 3, the system includes visualizations via a user interface 301 on an operator device 300 (e.g., tablet computer, etc.) that provide the operator with a two-dimensional (2D) view 302 from a robot's cameras 304 and a 3D simulation 306 of the robot 308, a third person view. These views are augmented with markers of target objects (e.g., a power tool) and obstacles, which are identified either automatically or user defined for maximum comfort and flexibility. Given this augmented reality, the operator chooses an action (e.g., pick up power tool) and test-runs it on the simulator. The simulator displays a range of possible outcomes across random variations of uncertain parameters (e.g., friction) to compensate for the imperfect match between the simulator and the real world.

The system enables the control of complex robots from a distance while addressing the challenges of dealing with limited situational awareness and reducing operator workload. The unique display and simulation environment allows a robotic operator to plan actions more effectively, that is, much faster compared to direct teleoperation and requiring less cognitive load since the operator can provide higher level control commands. The displayed variability of a robot's actions assists the operator in deciding if the control command can be executed safely on the robot, which will then carry it out autonomously. Thus, the operator can judge if the outcome will be successful despite differences between the simulator and real world. If the execution seems unsafe, the operator can choose alternative control commands.

The system can be implemented in robots as used in a variety of manufacturing, surveillance, and military operations. For example, the system can be deployed for advanced manufacturing (increasing the throughput for airplane production) and defense applications.

(3) Specific Details of the Invention

Referring again to FIG. 3, the system includes software running on serial or parallel processors. At the highest level, the software is split into two components: one implemented in an operator processor 310 for the operator (in the operator device 300) and one implemented in a robot processor 312 for the robot 308. As noted above, the operator device 300 provides a graphic user interface to plan, test and supervise robotic actions.

Figure 5:
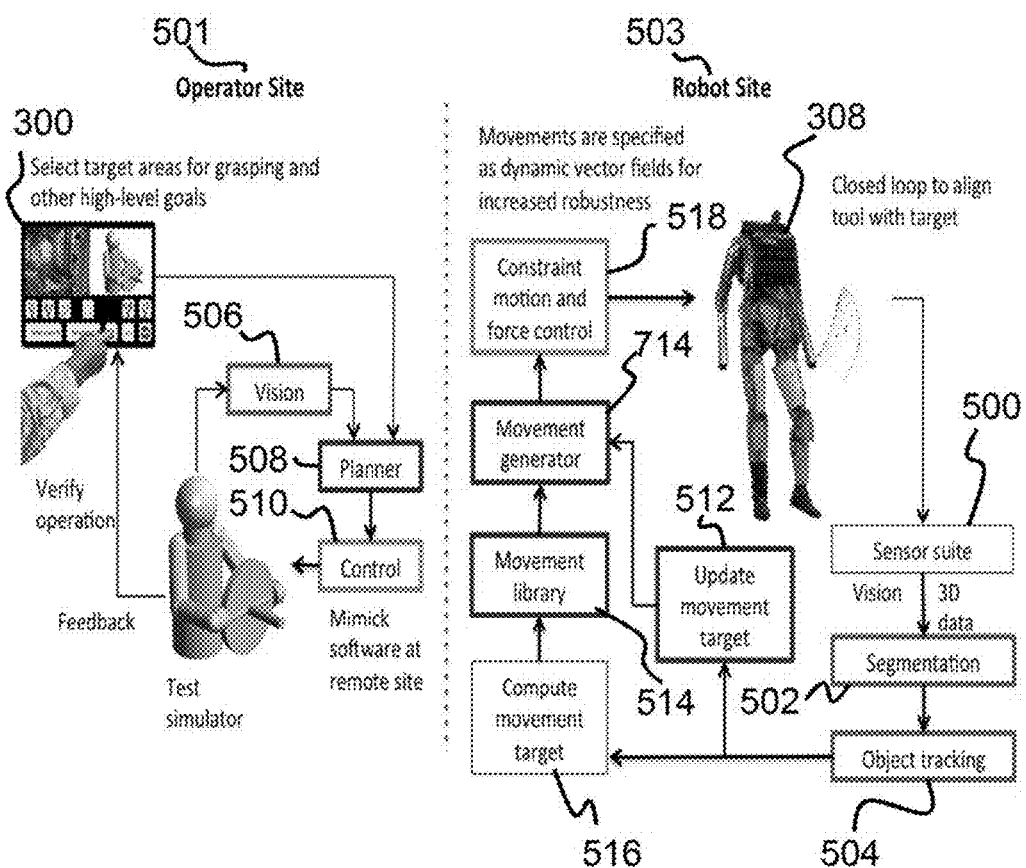
FIG. 5 is an illustration depicting system architecture according to an embodiment.

At the beginning of a task, the robot 308 sends vision and 3D data to the operator device 300. For example and as shown in FIG. 5, the robot 308 includes a sensor suite 500, such as a video camera and 3D sensor to generate the 3D data (point cloud), or, in another embodiment, the sensor suite 500 can include a stereo camera that generates 3D stereoscopic data. However, desirably, the 3D sensor is any suitable 3D sensor that is capable of generating a 3D point cloud. In one embodiment, the robot 308 includes relevant object segmentation 502 and object tracking 504 functions to identify relevant objects in the scene as presented in front of the robot. Alternatively or in addition to, the object segmentation 502 and object tracking 504 can be similarly employed as a vision module 506 on the operator device 300 given the vision and 3D data. The object segmentation 502 and object tracking 504 can be implemented using, for example, Mean-Shift segmentation and Parallel Tracking and Mapping. Mean-Shift segmentation was described by D. Comaniciu and P. Meer, in "Mean Shift: A Robust Approach Towards Feature Space Analysis," *IEEE Transactions on*

Figure 4:
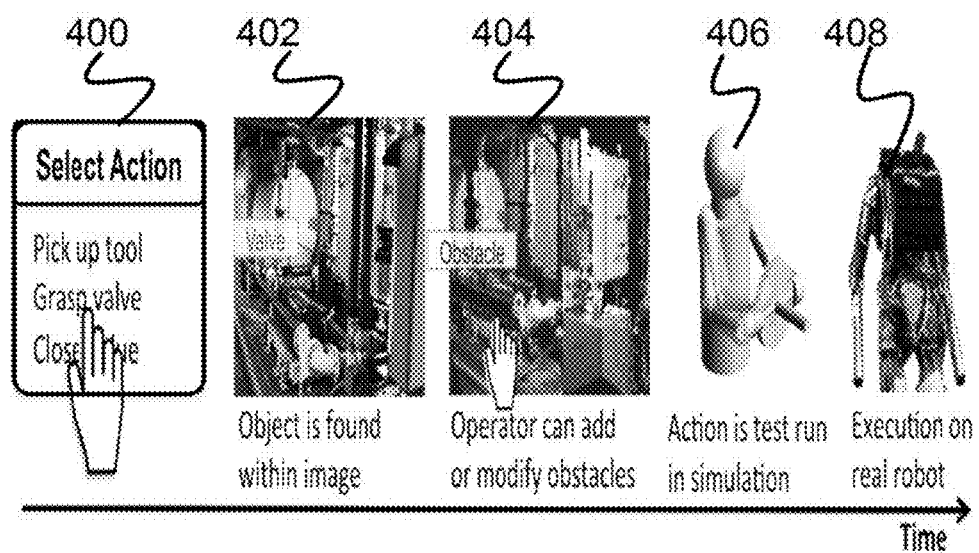
FIG. 4 is an illustration depicting an example of goal-oriented control and prediction of action outcomes.

*Pattern Analysis and Machine Intelligence*, vol. 24, pp. 1-18, 2002, which is incorporated by reference as though fully set forth herein. Alternatively, Parallel Tracking and Mapping was described by Georg Klein and David Murray. Parallel Tracking and Mapping for Small AR Workspaces, Proc. Sixth IEEE and ACM International Symposium on Mixed and Augmented Reality, 2007, which is also incorporated by reference as though fully set forth herein As shown in FIG. 4, the operator device provides a selection of actions 400 for the robot to perform. After the operator selects an action 400, the system identifies the relevant object 402 (as applicable to the selected action 400) in the image. The object 402 is identified by using an object recognition method, e.g., iterative closest point to match a 3D point cloud with a 3D object template or a deep learning appearance based method. Iterative closest point was described by Rusinkiewicz, S. and Levoy, M. in "Efficient variant of the ICP algorithm," Proceedings of 3-D Digital Imaging and Modelling (3DIM) (2001), which is incorporated by reference as though fully set forth herein. Alternatively, the deep learning based method was described by Szegedy, Christian, Alexander Toshev, and Dumitru Erhan in "Deep neural networks for object detection," Advances in Neural Information Processing Systems (2013), which is incorporated by reference as though fully set forth herein. The operator is also given the option of adding or modifying obstacles 404 as displayed in the image. The operator can add or modify the obstacles 404 by hand through a touch screen or using any other input device, providing labels, etc. Thereafter, the action is test run in simulation to provide a simulator outcome 406. The simulator allows an operator to predict a range of possible outcomes given the uncertainty of the simulated model and the sensed environment. This simulator mirrors the control architecture on the real robot. Based on the simulator outcome 406, the operator can decide to execute 408 the action on the robot.

For further understanding, FIG. 5 shows the different computations on the operator site 501 and robot site 503. On the operator site 500, the robot's actions are simulated in closed loop with simulated vision 506, planner 508 and control 510. The operator can verify the outcome of this simulation on the operator device 300 (e.g., on a touchpad display). On the robot site 503, the robot 308 executes an action that was approved by the operator (via the operator device 300). For this execution, in a closed loop, the sensor suite 500 records data from the robot 308 and environment. The vision system segments 502 and tracks 504 objects in the scene. Based on the vision of the updated movement target 512 and corresponding movement library 514 (which has movements corresponding to a computed movement target 516), the movement generator 714 creates and updates movement plans (via constraint motion and force control 518), which are then executed on the robot 308. On the operator site 501, the simulator (via the operator device 300) uses the same processing software modules for vision, planning, and control/execution as on the robot site 503.

Referring again to FIG. 4, in one example, the selected object 402 and obstacle 404 positions and orientations and an identification number of the selected action 400 are uploaded (1 kbit/sec, for example, is sufficient) onto the robot, which executes 408 this action autonomously given onboard perception, planning and control.

During the execution, for supervision, the robot transmits its position relative to a 3D point cloud (at 25 Hz: <3 kbit/sec) and video at a lower sampling rate. As understood by those skilled in the art, a 3D point cloud is a set of data points in a 3D coordinate system as generated using a 3D sensor (as attached with the robot). The video rate can be adjusted to the available bandwidth limit (e.g., 0.5 Hz of JPG-compressed VGA images: 50 kbit/sec).

The approach provides an intuitive interaction by tightly coupling perception capability for automatically determining the pose, location and class of objects on-board the robot with the views the operator interacts with to command the robot and gain situational awareness. Markers (in an augmented reality (AR) interface for the operator) provide the mechanism for this coupling, are accurately registered to the views in 2D visual imagery as well as 3D point cloud data, and can be generated either by the operator or automatically by the robot.

Figure 6:
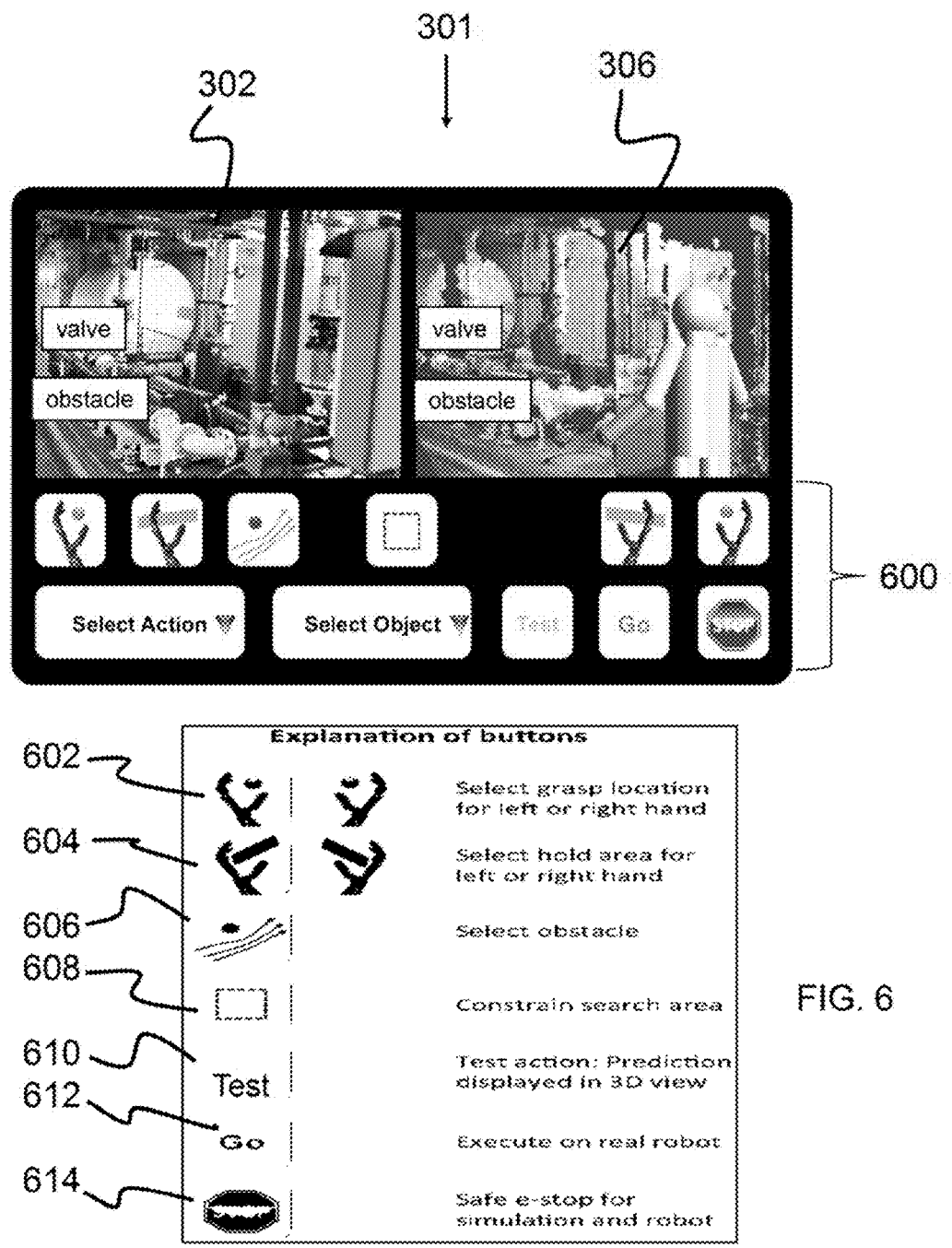
FIG. 6 is an illustration depicting a user interface according to an embodiment.

As shown in FIG. 6, the user interface 301 contains a window of the camera's 2D view 302 from the robot's perspective, a 3D view of the robot simulation 306 and surroundings, and virtual buttons 600. It should be understood that the virtual buttons 600 include any suitable controls as may be desired. For example and as depicted, buttons can be included to select a grasp location 602, select a hold area 604, select an obstacle 606, constrain a search area 608, test an action to generate the simulation 610, execute a real action 612, and stop 614.

As noted above, the operator device (and its user interface 301) can be implemented on any suitable processing device. As a non-limiting example, the user interface 301 can be implemented on a touchpad for easy mobility and, in another embodiment, a standard computer having a monitor with mouse input for a fixed site infrastructure. When using a touchpad, for example, pointing movement of the pad controls the robot's head to manipulate the view direction of the robot. The 3D view shows a point cloud from the robot embedded in the physics simulation, and thus, gives the operator a third-person view of the robot.

Figure 7:
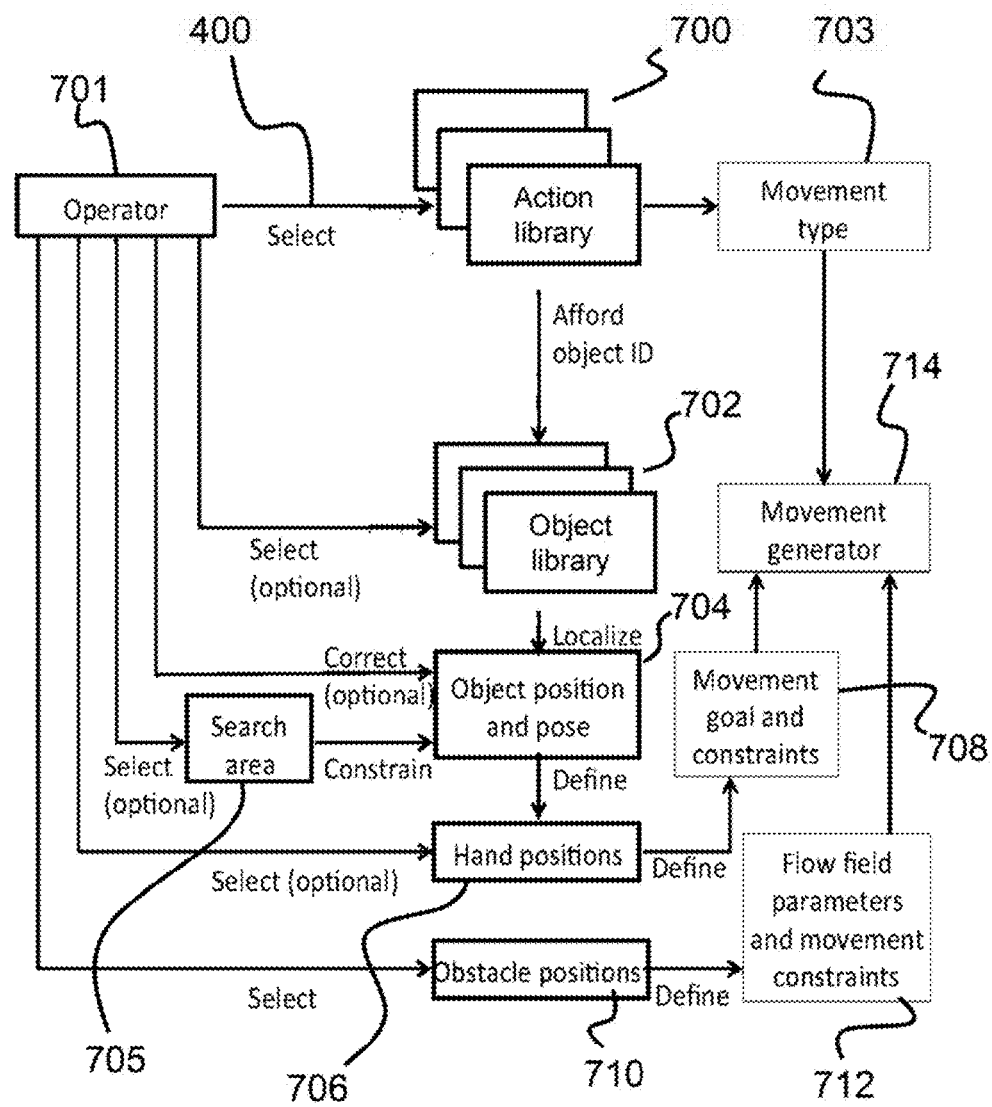
FIG. 7 is a flow chart illustrating a process flow for generating robot commands based on operator interaction according to an embodiment.

As shown in FIG. 7, to command the robot, the operator 701 first selects an action 400 from an action library 700 (i.e., a robotic action from a library of actions), which generates a simulation of the robot performing the selected action. The action library 700 contains complex actions (movement types 703 such as grasp and turn a valve) in addition to a movement primitive basis set to deal with unexpected situations (e.g., need to remove obstructing piece of debris or error recovery). A movement primitive basis set is obtained from human demonstration and converted into robotic movement plans using any suitable technique, a non-limiting example of which is described by Heiko Hoffmann, Peter Pastor, Dae-Hyung Park, and Stefan Schaal in "Biologically-inspired dynamical systems for movement generation: Automatic real-time goal adaptation and obstacle avoidance," IEEE International Conference on Robotics and Automation (2009), which is incorporated by reference as though fully set forth herein.

Based on the selected action (from the action library 700), the system finds relevant objects in the image (e.g., valve) from an object library 702, or the operator may select an object. A non-limiting example of a process for recognizing objects in a 3D point cloud is the iterative closest point algorithm. To help or improve the localization of the object, a constrained search 705 area can be selected in either a 2D or 3D view. The identified object is then displayed or labeled. An example of such a display is provided in the 2D view 302 of FIG. 6, in which an "object" is labeled (providing an augmented object marker). The operator may use the operator device to provide object maker labels or manipulate object markers Optionally, the operator 701 may click/tap on the object (as represented on the display, such as that shown in FIG. 6))

to correct the object position and pose (e.g., through multi-touch interaction) 704. Thus, the interface on the operator device allows the user to manipulate object markers, including changing object size, object marker size, object marker position, and labels.

Known objects (e.g., valve) contain desired grasp points (in object centered coordinates). If the object is unknown however, or cannot be automatically localized within the image, the operator 701 may also specify the goal hand positions 706 of a movement to define movement and goal constraints 708, e.g., the grasp location by touching and dragging a corresponding icon. Moreover, the interface allows specification of whole areas to hold on to (e.g., handrail). To ease the interaction, the operator 701 just requires one click/tap on the area, and the perception software will auto-complete the whole area. A non-limiting example for auto-completion is the Snake Energy Minimization algorithm, as described by Kass, M.; Witkin, A.; Terzopoulos, D. in "Snakes: Active contour models", International Journal of Computer Vision 1 (4): 321 (1988), the entirety of which is hereby incorporated by reference as though fully set forth herein. Obstacles 710 are either automatically detected or specified by the operator 701 using the user interface and system. In addition, the operator 701 can define a safety margin around an obstacle (e.g., by touching the obstacle on the user interface with a thumb and index finger and sliding open both fingers) which, in effect, generates flow field parameters and movement constraints 712 for the robot. A movement generator 714 then generates robot movements given the movement type 703, any movement and goal constraints 708, and any flow field parameters and movement constraints 712.

Before executing an action on the robot, the operator can run a test in simulation by simulating the robot movements as generated by the movement generator 714. A physics simulation predicts the result and variability of the interaction of the robot in its environment using the same autonomy software as on the real robot (an architecture of which is depicted in FIG. 5). Variability occurs, e.g., as a result of uncertain contact friction, and its prediction is essential for judging the robustness of an action choice. To predict variability, several runs are executed in parallel with parameter variations (e.g., varying friction coefficients and object positions). The resulting variability is overlaid onto the robot animation (e.g., with different transparencies) and displayed in the 3D-view window of the operator device. Based on the outcome, the operator can correct target and obstacle locations, choose different actions or execute the actions on the real robot. Further, the scene can be dynamic, with the display showing the evolving scene (such as robot movement or object movement in the scene, etc.).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for robot supervisory control, the system comprising:
    an operator device, the operator device having one or more processors and a memory, the memory being a non-transitory computer-readable medium having executable instructions encoded thereon, such that upon execution of the instructions, the one or more processors perform operations of:
        receiving camera imagery from a camera mounted on a robot, the camera generating camera imagery from a scene in front of the robot, the scene having one or more objects therein;
        receiving three-dimensional (3D) data from a sensor mounted on the robot;
        displaying a user interface that includes a two-dimensional (2D) view of the scene from the camera and 3D data from the sensor;
        overlaying one or more object markers of objects in the scene on the 2D view or 3D data;
        receiving a selected action from an operator regarding objects in the scene and generating a simulation of the robot performing the selected action; and
        rendering the simulation overlaid on top of the 3D data.

2. The system as set forth in claim 1, wherein the operator device is configured for receiving, via the user interface, commands from a user to add or modify object markers for objects or obstacles in the 2D view of the scene.

3. The system as set forth in claim 1, further comprising a robot, the robot having a camera and a three-dimensional (3D) sensor mounted thereto, the 3D sensor generating the 3D sensor data.

4. The system as set forth in claim 1, further comprising a library of actions from which a user chooses commands for the robot.

5. The system as set forth in claim 1, wherein the user interface is operable for allowing a user to manipulate object markers in the scene, where the manipulation involves changing object marker size or position.

6. The system as set forth in claim 1, wherein a subset of the object markers label obstacles in the scene.

7. The system as set forth in claim 1, further comprising an overlay display showing variability of the simulation of the robot performing the selected action.

8. The system as set forth in claim 1, wherein the scene is dynamic and the operator device displays an evolving scene.

9. The system as set forth in claim 1, further comprising a robot, the robot having a camera and a stereoscopic camera mounted thereto, the stereoscopic camera generating the 3D sensor data.

10. A method for robot supervisory control, the method comprising an act of:
    causing one or more processors to execute instructions encoded on a non-transitory computer-readable medium, such that upon execution, the one or more processors perform operations of:
        receiving, in an operator device, camera imagery from a camera mounted on a robot, the camera generating camera imagery from a scene in front of the robot, the scene having one or more objects therein;
        receiving, in the operator device, three-dimensional (3D) data from a sensor mounted on the robot;
        displaying, on the operator device, a user interface that includes a two-dimensional (2D) view of the scene from the camera and 3D data from the sensor;

overlaying one or more object markers of objects in the scene on the 2D view or 3D data;

receiving, on the operator device, a selected action from an operator regarding objects in the scene and generating a simulation of the robot performing the selected action; and rendering the simulation overlaid on top of the 3D data and displaying the rendering on the operator device.

11. The method as set forth in claim 10, further comprising an act of receiving, via the user interface, commands from a user to add or modify object markers for objects or obstacles in the 2D view of the scene.

12. The method as set forth in claim 10, further comprising an act of providing, via the operator device, a library of actions from which a user chooses commands for the robot.

13. The method as set forth in claim 10, further comprising an act of providing, via the operator device, a user interface that is operable for allowing a user to manipulate object markers in the scene, where the manipulation involves changing object marker size or position.

14. The method as set forth in claim 10, further comprising an act of providing, via the operator device, an overlay display showing variability of the simulation of the robot performing the selected action.

15. The method as set forth in claim 10, further comprising an act of providing, via the operator device, a dynamic scene through which the operator device displays an evolving scene.

16. A computer program product for robot supervisory control, the computer program product comprising:

a non-transitory computer-readable medium having executable instructions encoded thereon, such that upon execution of the instructions by one or more processors, the one or more processors perform operations of:

receiving, in an operator device, camera imagery from a camera mounted on a robot, the camera generating camera imagery from a scene in front of the robot, the scene having one or more objects therein;

receiving, in the operator device, three-dimensional (3D) data from a sensor mounted on the robot;

displaying, on the operator device, a user interface that includes a two-dimensional (2D) view of the scene from the camera and 3D data from the sensor;

overlaying one or more object markers of objects in the scene on the 2D view or 3D data;

receiving, on the operator device, a selected action from an operator regarding objects in the scene and generating a simulation of the robot performing the selected action; and rendering the simulation overlaid on top of the 3D data and displaying the rendering on the operator device.

17. The computer program product as set forth in claim 16, further comprising instructions for causing the one or more processors to perform an operation of receiving, via the user interface, commands from a user to add or modify object markers for objects or obstacles in the 2D view of the scene.

18. The computer program product as set forth in claim 16, further comprising instructions for causing the one or more processors to perform an operation of providing, via the operator device, a library of actions from which a user chooses commands for the robot.

19. The computer program product as set forth in claim 16, further comprising instructions for causing the one or more processors to perform an operation of providing, via the operator device, a user interface that is operable for allowing a user to manipulate object markers in the scene, where the manipulation involves changing object marker size or position.

20. The computer program product as set forth in claim 16, further comprising instructions for causing the one or more processors to perform an operation of providing, via the operator device, an overlay display showing variability of the simulation of the robot performing the selected action.

21. The computer program product as set forth in claim 16, further comprising instructions for causing the one or more processors to perform an operation of providing, via the operator device, a dynamic scene through which the operator device displays an evolving scene.

* * * * *